INVENTORS
Henry N. Staats
Maurice D. Levitan

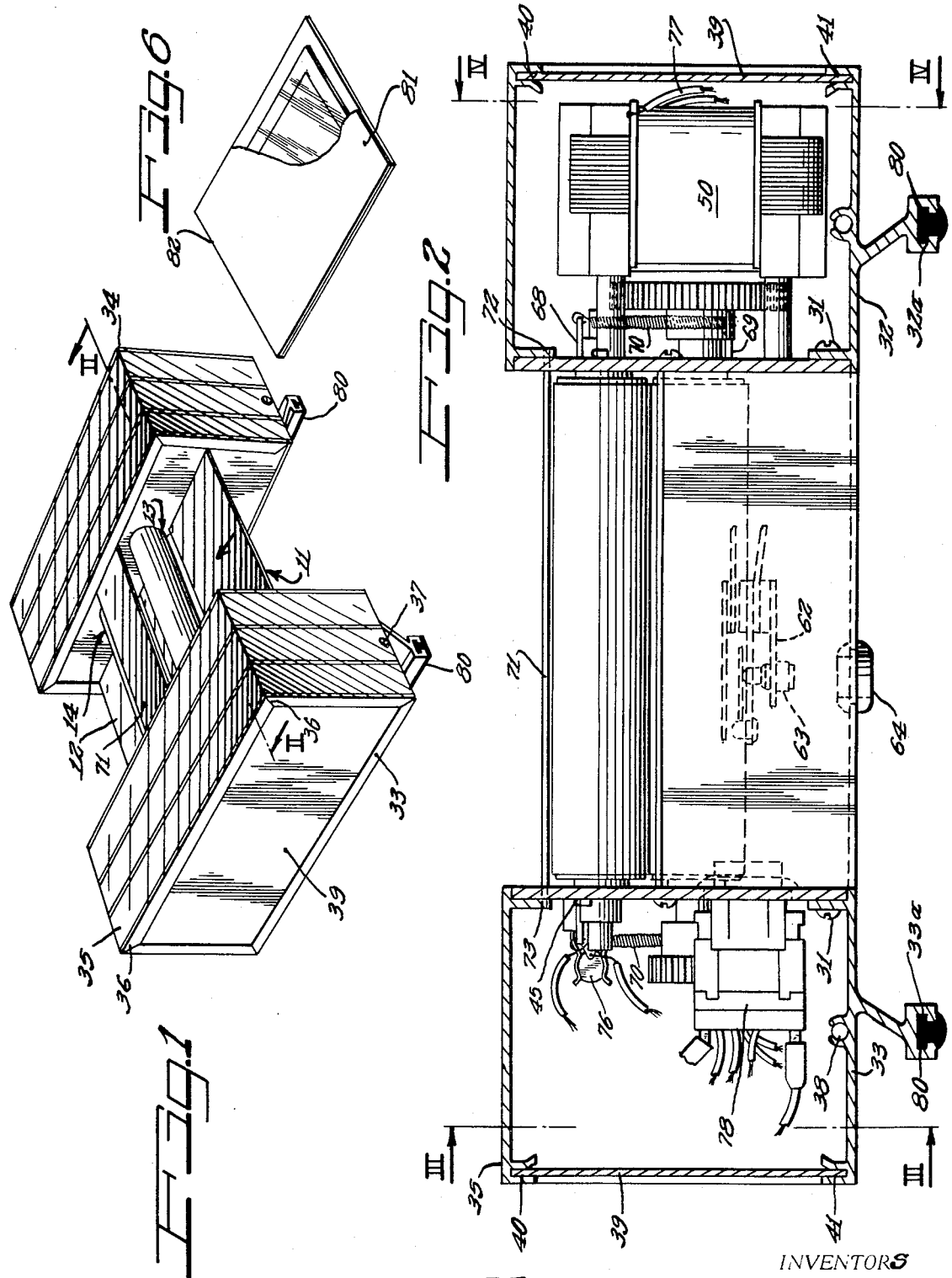

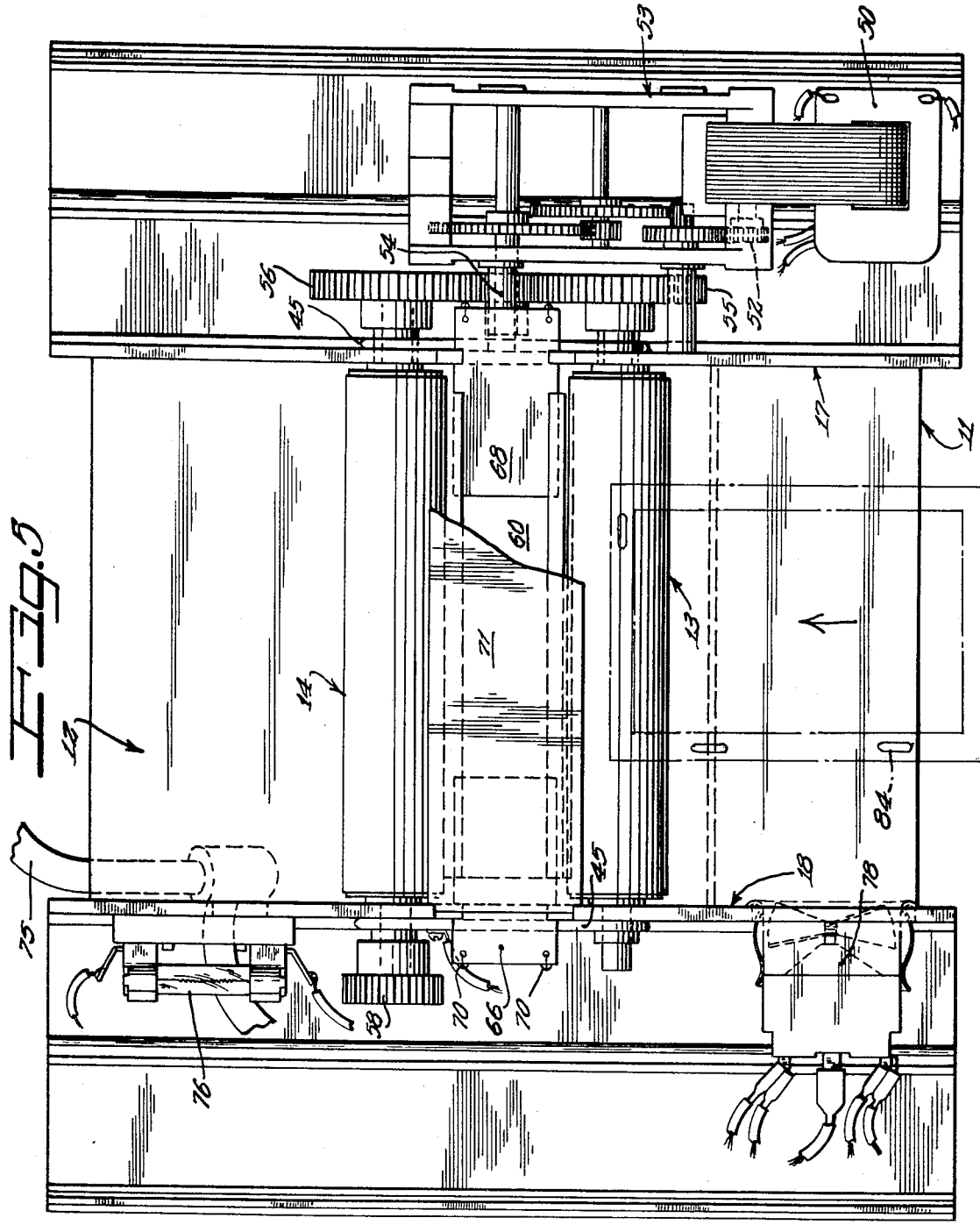

United States Patent Office 3,711,355
Patented Jan. 16, 1973

3,711,355
LAMINATOR
Henry N. Staats, Deerfield, and Maurice D. Levitan, Wilmette, Ill., assignors to General Binding Corporation, Northbrook, Ill.
Filed Apr. 17, 1970, Ser. No. 29,559
Int. Cl. B32b 31/04
U.S. Cl. 156—499          5 Claims

ABSTRACT OF THE DISCLOSURE

A compact laminating device for applying heat and pressure to a sandwich of materials to be laminated together. A highly efficient material transfer and heat application system is constructed of a minimum of moving parts and the stationary components are manufactured of simple extrusions. A pre-formed laminating sandwich with a thermal and pressure equalizer is employed in combination to provide an essentially wrinkle-free and air bubble-free laminated product.

BACKGROUND OF THE INVENTION

The art of laminating one or both sides of a paper, or other, core with a thermoplastic sheet material has become a relatively sophisticated one. Much effort has been extended in the last decade to improve the apparatus and the related techniques for lamination, and the substantial improvements that have been achieved have materially increased the field of use of laminates. One of the major modern uses for lamination techniques is the field of small-sized identification cards, credit cards and related wallet-sized card devices. In more recent times, such card devices have also been employed as input mechanisms for computerized information systems. In the early days of lamination techniques, the identification card field was relatively limited since the bonding was oftentimes inadequate and tampering was relatively simple. With the improvement of lamination techniques, in general, and with improved systems such as described below, substantially all deviations from standard size and lamination thickness are avoided successfully. The system of the present invention permits, accordingly, the manufacture of laminated cards having virtually bubble-free, distortion-free, and tamper-proof surfaces.

SUMMARY OF THE INVENTION

The small, compact, laminating appaartus of the present invention, and the system materials employed therewith, form a novel and highly effective laminating combination. In accordance with the present invention, a material to be laminated, such as paper, photographs, vinyl identification sheet, or the like, is initially positioned between a pair of superposed sheets of laminate material. The sandwich thus formed, which may be likened to a pouch with paper or like material positioned internally therein, is introduced, as a unit, into a compact laminator. The laminator, constructed in accordance with the present invention, comprises a first pair of driving or feed rolls into which the sandwich to be laminated is introduced. A second pair of driven rolls is positioned downstream of the first pair and is substantially synchronously driven with the first pair so that the pouch is introduced into the nip between the second pair of rolls as it leaves the first pair. Between the pairs of rolls, a heating oven is provided for applying heat to the pouch immediately prior to its insertion into the second pair of rolls. In operation, the pouch is supported in a cantilever fashion by the first pair of drive rolls so that it does not effectively touch any surface of the heater oven and is, accordingly, heated uniformly just prior to its pressurization in the thus heated state by the laminating rolls of the laminator apparatus.

We prefer to employ a relatively thick laminating material to prevent the pouch with its enclosed material to be laminated from sagging into contact with the bottom surface of the heater oven. We have found, for example, that if the thinner laminating material conventionally used for thin laminates, such as, for example, a lamination of one mil polyester (for example, Mylar) with five mils of heat-sealable thermoplastic (for example, polyethylene), the one mil polyester is insufficiently stiff to support the heated, soft, heat-sealing material during passage through the oven. On the other hand, when the polyester is provided in a thickness from two to eight mils, coupled with a five or six mil layer of heat-sealable material, the pouch is sufficiently stiff as it passes between the initial drive and following laminating rolls to prevent any sagging contact with heater surfaces. A particularly satisfactory combination comprises five mil thick polyester with a five or six mil adhesive layer.

Our experience has also shown that substantially perfectly flat, air-free laminates are achievable through the use of a heat-conductive pouch cover having, preferably, some stiffness. For example, we have found that an aluminum pouch cover of approximately three mils thickness provides an extremely reliable and effective cover. We have found that the use of such a cover provides a startling improvement in flatness and elimination of distortion. We have found that operation of the apparatus at a lineal speed of approximately eight inches per minute with a heater temperature in the general range of approximately 250° F. to 275° F. provides a satisfactory regime when employing a high molecular weight ethylene-ethyl acrylate copolymer such as "Poly-X" as the adhesive material and when employing an apparatus as herein described.

The specific apparatus employed in accordance with the present invention is a novel device employing absolute minimum number of components substantially all of which comprise metal or rubber extrusions whereby cost is so reduced as to enable marketing the laminator of the present invention at a modest cost not heretofore possible.

DESCRIPTION OF THE DRAWINGS

FIG. 1 is an isometric view of the laminator of the present invention;

FIG. 2 is a cross-sectional view taken along the line generally indicated at II—II of FIG. 1;

FIG. 5 is a plan view, partially broken away, of the laminator apparatus; and

FIG. 6 is an isometric view of a laminate pouch constructed in accordance with the present invention.

DETAILED DESCRIPTION

Figure 3:
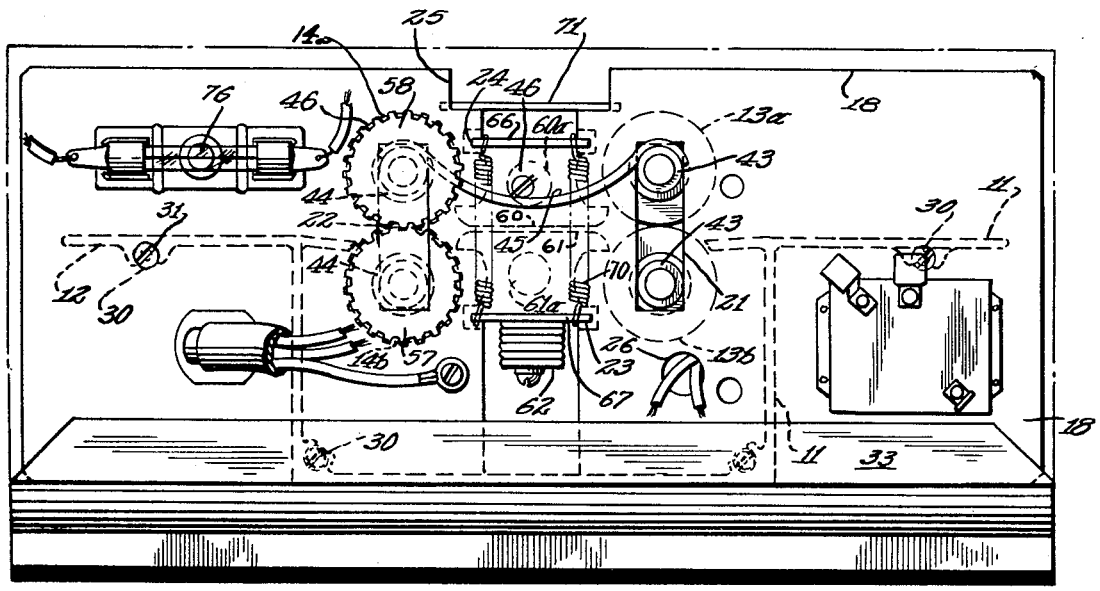
FIG. 3 is a cross-sectional view taken along the line generally indicated at III—III of FIG. 2.

As may be seen from a consideration of FIG. 1, the laminator of the present invention has a generally rectangular appearance. It is provided with a feed table member 11 and an output table 12 between which are positioned a first pair of feed rolls 13 and a second pair of laminator rolls 14. A heating oven is positioned between the rolls and is hidden from view in FIG. 1 by a heat insulating cover 71. As can be seen from FIGS. 5 and 6, a pouch or sandwich of material to be laminated, generally indicated at 81, is directed into the laminator in the direction of the arrow shown.

The laminator of the present apparatus is extremely small and particularly adapted to the lamination of identification-sized cards which provide an over-all dimension on the order of 2½ inches to 3½ inches. The drawings reflect this small size and approximate, in this application, 90% of the size of the actual laminator. It will be understood, of course, that the laminator may be made in other sizes, both larger and smaller, but the size of the illustrated embodiment is particularly satisfactory for the vast market for identification, credit, and like cards.

As may be seen from the detailed FIGS. 2 through 5, the laminator is simply constructed of a very few parts assembled in interlocking relation. Mounting plates generally indicated at 17 and 18 are substantially identical in being provided with symmetrical mounting plate cut-outs 19, 20 and 21, 22, respectively, and with heater element mounting slides 23, 24, and upper heater insulator slot 25. As a result of this similarity, both plates may be made by one press, any subsequent additional holes, such as, for example, miscellaneous wiring holes 26, as shown in plate 18 in FIG. 3, being easily punched later. The mounting plates 17, 18 are rigidly secured to the table members 11 and 12 comprising identical extrusions of approximately Z configuration. The Z extrusions are provided with partial cylindrical grooves 30 in which screws 31 of a self-tapping nature may be threaded. Simultaneous assembly of the table parts 11 and 12 with the plates 17 and 18 and support frames 32 and 33, which also are identical extrusions, is accomplished by the screws 31. Upon this basic, essentially rigid frame or housing, the end covers 34 and 35, which comprise continuous extrusions noted and bent into upsidedown U's are easily fitted. These components may more clearly be seen from FIG. 1 where the notches 36, for example, are shown. When bent into the shape illustrated, the covers may be rigidly secured to their respective support frames, for example, 33, by the screws 37 which cooperate with the partial cylindrical grooves 38 extruded in the base plates 32, 33. End panels, which may be decorative, are carried, as at 39, by grooves 40 in the covers 34, 35 and aligned grooves 41 in the support frame 32, 33. By this simple expedient, the end panels may be readily replaced and may carry advertising indicia, or any form of highly decorative emblem.

Figure 4:
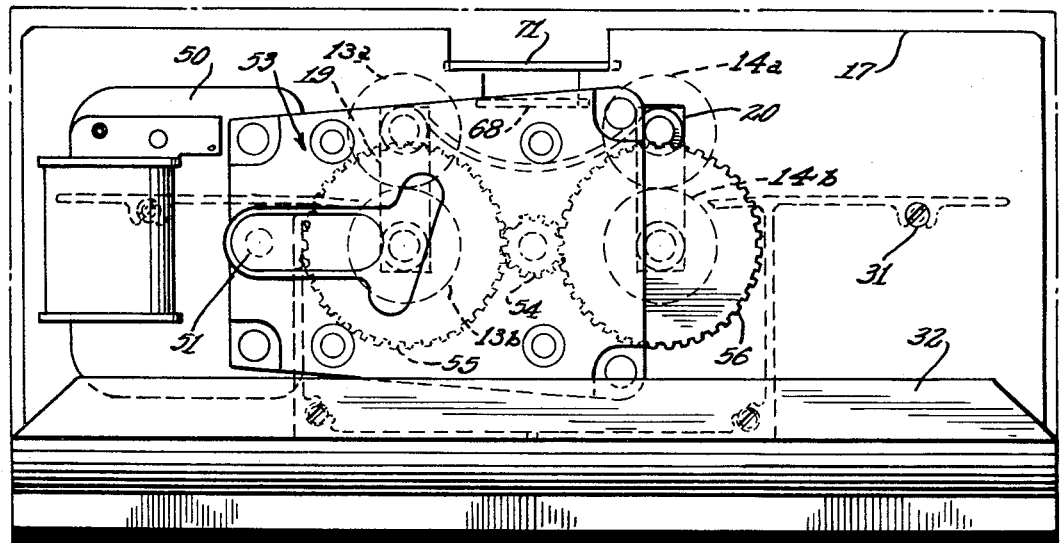
FIG. 4 is a cross-sectional view taken along the line generally indicated at IV—IV of FIG. 2.

Upon this basic frame or housing, two pairs of rollers, with an intermediate heater, are positioned. The structure can be well seen from a consideration of FIG. 3. There, the feed rolls 13a and 13b are carried in bearing blocks 43. Similarly, the laminating rolls 14a and 14b are carried in bearing blocks 44. Spring bias is applied to the upper rolls 13a, 14a by way of a spring 45 which straddles the bearing blocks 43, 44, and is centrally held down by a projecting abutment, here shown in the form of a screw 46 threaded into plate 18. As can be seen from FIG. 4, the identical relationship is provided on the other side of the laminator apparatus. As shown in FIGS. 3 and 4, the laminator is driven by an electric motor 50 having a rotor 51 driving a drive gear 52. The gear 52 drives a gear reduction chain in transmission housing 53 providing a reduced speed output at gear 54 positioned essentially between identical drive gears 55, 56 splined to the respective lower rolls 13b, 14b. This drive provides synchronized rotation between the lower rolls of the two roller pairs. The upper and lower rollers 14a and 14b of the second pair of rollers are synchronously driven by means of gears 57, 58 on the ends of respective rollers 14b, 14a remote from the gear 56. Rotation of both rollers 14a, 14b at identical speeds eliminates curl in the laminate passing through the apparatus. Although synchronizing gears are not shown for providing such synchronous rotation between rolls 13a and 13b, they may be added if desired, in the manner identical to the gears employed with rollers 14a, 14b. It is not ordinarily necessary to provide for such synchronization on the feed rolls since the plastic laminates passing therebetween are in a cold, and hence relatively stiff, condition.

Heat is provided for the lamination process by a pair of identical extrusions shown in dotted lines in FIG. 3. There, upper heater 60 and lower heater 61 are illustrated as having longitudinal bores 60a and 61a respectively. The bores are provided with electrical thermal units which may be of any conventional form and which are supplied by way of a thermostatic switch 62 which is provided with a temperature adjustment screw 63 accessible via grommet 64. The heater elements 60 and 61 are spaced to provide passage of the laminate sandwich without mechanical touching. The positioning of the heater element is accomplished by way of two pairs of spring tensioned positioning plates constructed of thermally insulating material. These are illustrated at 66, 67, 68 and 69, with the individual plates being spring-pressed together by four identical springs 70. Each of the plates 66, 67, 68 and 69 slide into longitudinally extending grooves in the heaters 60, 61, which grooves are aligned with the notches 23 and 24 in the upport mounting plates 17 and 18. The springs 70 provide tension which prevents rattling and positively position the extrusion-formed heaters 60 and 61. Since the plates 66, 67, 68 and 69 are constructed of a heat insulating material, heat from the heating elements 60 and 61 is applied to the metal parts of the laminating apparatus only through conduction of the air. Any possibility of the laminator user being burned by the heating elements is prevented through the utilization of a thermally insulating cover 71 which rests in the notch 25 in the end plates 17 and 18. The plate 71 is maintained in position by the bottom edges 72 and 73 of the respective covers 34 and 35 when they are assembled, as is shown in FIGS. 1 and 2.

Power may be applied to the system in any conventional manner such as an inlet power cord 75 which is fused at 76 and provides power for the heater via the thermostatic switch 62 and for the motor 50 via leads 77. An on-off switch 78 is provided incorporating a "ready" indicator lamp which energizes upon attainment of the desired operating temperature at the thermostat 62.

The support frames 32 and 33 are, as above noted, identical extrusions and are provided with longitudinally extending grooves 32a and 33a, respectively. A rubber extrusion 80 is provided in each of these grooves and provides a longitudinally extending foot under the entirety of the support frames. By making the external dimensions of the extrusion 80 substantially the same or slight larger than the internal dimensions of the grooves 32a, 33a, the extruded foot may be inserted by initially stretching it. When in place, the foot provides exceptionally good, firm mounting for the apparatus and, in our experience, completely eliminates any inadvertent movement of the machine in spite of its relative lightness.

In operation, a laminate pouch, with or without a foil folder as shown in FIG. 6, is placed on table 11 and introduced between rolls 13a, 13b as illustrated in FIG. 5. As it passes through the heaters, the polyethylene becomes soft and upon continued, subsequent introduction and movement between the pressure rollers 14a, 14b, the pouch is laminated into a unified card. We have found that when a heat-conducting sheet 81 is provided on both sides of the laminate pouch, an extremely flat air bubble-free laminate is accomplished. In operation, it is preferred that the sheet comprises aluminum metal foil folded along the leading edge 82. Since the foil folder surrounding the pouch is not in any way affixed to the pouch, it may be re-used many times. It has been found that while heat-sealing adhesives, such as polyethylene or "Poly-X" squeeze out from the edges of the sandwich in some circumstances of temperature and pressure and may foul the rollers 14a, 14b, the utilization of the foil pouch completely obviates any such occurrence. At the same time, such foils as aluminum and copper do not adhere sufficiently to such extruded adhesive to prevent simple peeling of the foil from the finished laminate sandwich. As a result, the foil not only provides a superior product, but helps maintain perfect cleanliness in the apparatus itself.

The pouch of plastic materials is preferably constructed in accordance with my copending application, U.S. Ser. No. 884,837, filed Dec. 15, 1969, entitled "Method of Making a Flat Laminate," and is "spot-welded" several points as at 84 to assure proper alignment of the plastic laminates and to aid in positioning of the identification card, photograph, or the like, in position between the laminates. By providing the combination pre-assembled pouch, and the extremely simple laminating apparatus of the present invention, an overall system of laminating identification cards and the like has been accomplished. It will be apparent to those skilled in the art that variations may be made in accordance with the method and apparatus hereinabove set forth and it is, accordingly, our intention that the scope of the invention be limited solely by that of the hereinafter appended claims.

We claim as our invention:

1. An apparatus for laminating a discrete pouch of heat-sensitive plastic material and a discrete sheet of material to be laminated therein in a discrete relatively stiff unlaminated sandwich, comprising a housing, a pair of feed rollers secured in said housing and mounted for rotation about spaced axes, means resiliently biasing said rollers toward each other, means driving at least one of said pair of feed rollers, a second pair of laminating rollers mounted for rotation in position spaced from said first pair, means positively driving both of said second rolls and said one feed roller synchronously, and an oven extending substantially completely between said first and second pair of rollers for heating the sandwich substantially as it leaves said first pair of rollers and substantially until passage thereof through said second pair of rollers, said oven comprising a pair of spaced heating plate members positioned between said pairs of rollers and separated from each other a width greater than the thickness of said sandwich to permit passage of the sandwich therebetween without touching either heating member, said pairs of rollers being spaced apart a distance smaller than the sandwich whereby said sandwich is grasped between at least one of said pair of rollers throughout its passage through said oven and is thereby maintained separated from said heating members.

2. The apparatus set forth in claim 1 wherein said sandwich includes a pouch cover of material readily releasable from said plastic material following lamination.

3. A plastic laminating assembly for bonding a sandwich of heat-sensitive plastic material and sheet of material to be laminated therewith, comprising a housing, a pair of power-driven feed rollers secured in said housing and mounted for rotation about spaced axes, means resiliently biasing said rollers toward each other, a second pair of rollers mounted for rotation in position spaced from said first pair, and an oven extending between said first and second pair of rollers for heating the plastic material substantially until passage thereof through said second pair of rollers, means driving said second pair of rollers substantially synchronously with the drive applied to said first rollers, said housing comprising a pair of mounting support plates spaced by a pair of table members each rigidly secured to one of a pair of support frames, and screw means simultaneously rigidly securing said support frame, mounting plate and table members together.

4. The structure set forth in claim 3 wherein table members are identical extrusions and wherein said support frames are identical extrusions.

5. The structure set forth in claim 4 wherein each support frame includes a longitudinally extending extruded channel opening downwardly, and a resilient extrusion positioned therein and projecting therefrom to provide a longitudinally extending resilient foot for each support frame.

References Cited

UNITED STATES PATENTS

| | | | |
|---|---|---|---|
| 3,577,304 | 5/1971 | Guyer | 156—555 |
| 3,421,966 | 1/1969 | McLaughlin | 156—555 |
| 2,893,468 | 7/1959 | Fieroh | 156—580 |
| 2,722,735 | 11/1955 | Beamish | 156—555 |
| 2,046,047 | 6/1936 | Watkins | 156—580 |
| 3,027,285 | 3/1962 | Eisner et al. | 156—555 |
| 2,137,505 | 11/1938 | Osgood | 156—580 |

REUBEN EPSTEIN, Primary Examiner

U.S. Cl. X.R.

156—555